Dec. 30, 1924.
W. A. HUBENER
ANCHOR BOLT
Filed May 2, 1924    2 Sheets-Sheet 1
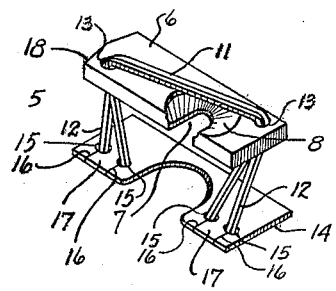
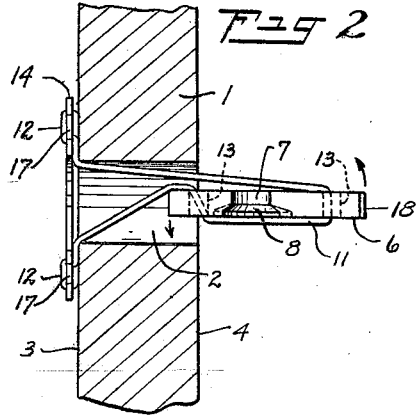
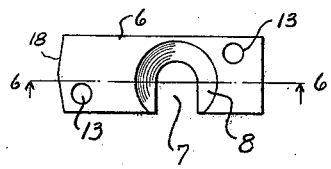
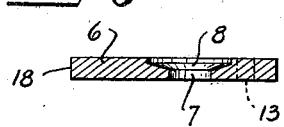
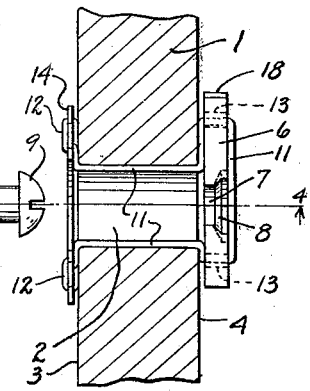
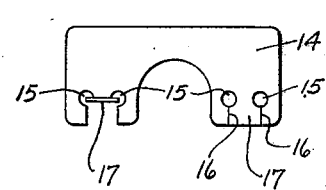
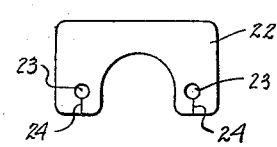
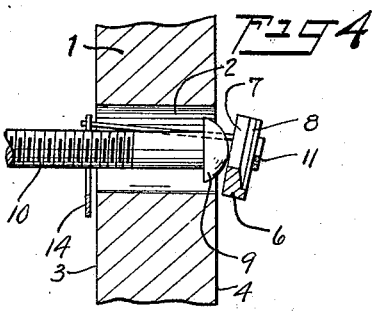
INVENTOR
William A. Hubener
BY
Alan M. Johnson
ATTORNEY Dec. 30, 1924.
W. A. HUBENER
ANCHOR BOLT
Filed May 2, 1924     2 Sheets-Sheet 2
1,521,026
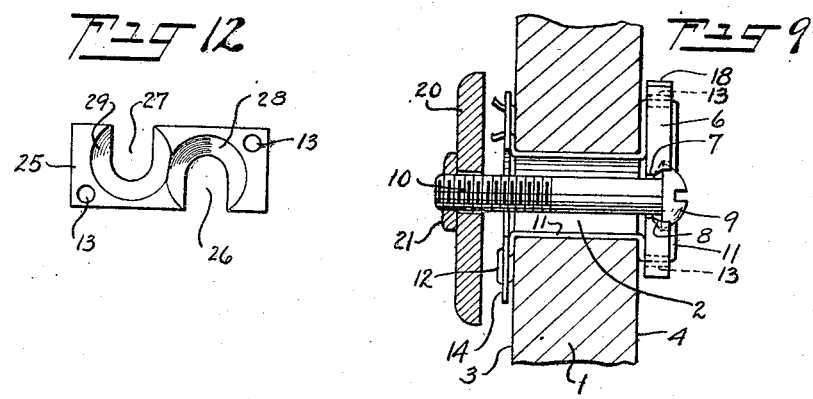
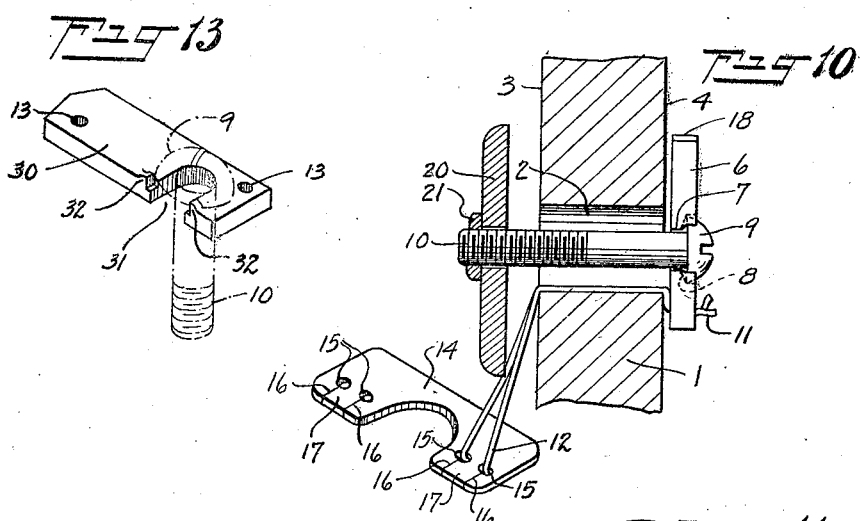
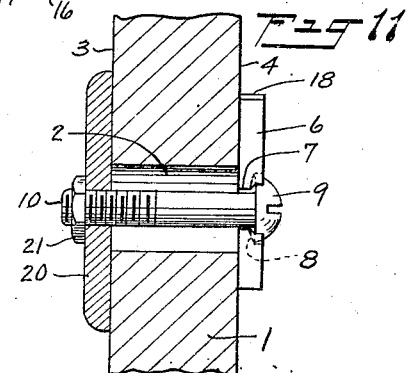

Patented Dec. 30, 1924.

1,521,026

UNITED STATES PATENT OFFICE.

WILLIAM A. HUBENER, OF NEW YORK, N. Y., ASSIGNOR TO DIAMOND EXPANSION BOLT COMPANY, OF NEW YORK, N. Y., A CORPORATION OF NEW YORK.

ANCHOR BOLT.

Application filed May 2, 1924. Serial No. 710,582.

*To all whom it may concern:*

Be it known that I, WILLIAM A. HUBENER, a citizen of the United States, residing at New York, in the county and State of New York, have made certain new and useful Improvements in Anchor Bolts, of which the following is a specification, taken in connection with the accompanying drawings.

My invention relates to anchor bolts or toggles, which can be used for general application to support an object on a wall or other support, where it is impossible or inconvenient to obtain access to the inside of the wall.

My invention further relates to securing the head of a bolt to the anchor member or toggle head, which has previously been inserted through a hole in the wall and pulled across the inner side of the hole by any means, flexible or resilient, manually or otherwise.

My invention further relates to such an anchor bolt or toggle provided with a resilient pull member which will yield when the head of the bolt is pressed against the anchor member, or toggle head, to prevent the head of the bolt to pass, and will then automatically cause the anchor member or toggle head to engage with the stem of the bolt. By then pulling out on the stem of the bolt, the head of the bolt will be secured in its proper position in the anchor member or toggle head.

My invention further relates to such an anchor bolt or toggle having a pull member holder, or plate, connected to the resilient pull member. This plate may be clamped against the wall, or may be discarded so that the work may be brought up flush against the surface of the wall or other suitable support.

My invention further relates to such an anchor bolt construction that possesses maximum strength for the size of the fastening, and yet is adapted to pass through a hole drilled in the wall very materially smaller than the hole required by other fastenings.

My invention further relates to certain combinations, details of construction, and articles of manufacture, which will be more fully hereinafter described and pointed out in the claims.

This application is to be considered in connection with my previous application for anchor bolt nuts filed Dec. 6, 1923, Ser. No. 678,894. In that construction the nut is secured on the inside, or inaccessible surface of the wall, whereas in the present invention the nut is on the exposed or accessible surface of the wall, and the head of the bolt is secured to an anchor member or toggle head which has previously been threaded through the hole in the wall, and positioned on the inaccessible surface of the wall over the end of the hole in any suitable manner, such as by a pull member, which is preferably, though not necessarily, resilient.

In the accompanying drawings, the same reference numerals refer to similar parts in the several figures.

Fig. 1 is a perspective view of the preferred form of my anchor bolt or toggle;

Fig. 2 is a horizontal section through a wall, or other suitable support, showing the manner of positioning my anchor bolt, which is shown pressed nearly through the hole, and about to be swung or rocked by the pull member in the direction of the arrows;

Fig. 3 is a horizontal section, the same as Fig. 2, showing the anchor member or toggle head positioned across the end of the hole and ready to be engaged by the head of the stove or other bolt;

Fig. 4 is a vertical section, substantially on the line 4—4 of Fig. 3, looking in the direction of the arrows, and showing the stove bolt rocking the anchor member or toggle head;

Fig. 5 is a plan view of the preferred form of anchor member or toggle head;

Fig. 6 is a vertical section on the line 6—6 of Fig. 5;

Fig. 7 is a plan view of the preferred form of pull member holder, with one of the tongues bent up ready to receive the pull member;

Fig. 8 is a plan view of a modified form of pull member holder;

Fig. 9 is a horizontal section, similar to Fig. 3, showing the position of the parts after the head of the bolt has become seated in the countersunk hole in the anchor member or toggle head. The work supported and the nut are shown in section. This view also illustrates the initial step of removing the pull member, should it be desired to remove said member;

Fig. 10 is a horizontal section, the same as Fig. 9, showing the pull member and the pull member holder partially removed from the wall;

Fig. 11 is a horizontal section, the same as Fig. 10, showing the pull member and the pull member holder entirely removed, and the work brought up flush against the exposed surface of the wall;

Fig. 12 is a plan view of a modified form of anchor member or toggle head;

Fig. 13 is a plan view of another modified form of anchor member or toggle head.

My invention is adapted for universal application wherever it is impossible, or inconvenient, to gain access to the rear of a wall, or other suitable support. It is particularly adapted to be used to support objects of work, of any kind, to walls formed of terra-cotta, brick or any other material. In drilling holes in such walls, it is essential that they be as small as possible, both for economy in drilling them, and also to avoid marring or weakening the wall.

In my invention the hole is but little larger than the size of the bolt to be used.

I have shown different embodiments of my invention in the drawings. With more particular reference to the Figs. 1 to 7 and 9 to 11, the wall or other suitable support 1 is provided with a hole 2 of the minimum diameter or size for the particular anchor bolt or toggle to be employed with it. For purposes of illustration it is assumed that the surface 3 is the exterior or exposed surface, and the surface 4 is the interior or inaccessible surface of the wall.

In my present invention my anchor bolt 5 is formed of an anchor member or toggle head 6 having a slot 7, and, in the preferred form, provided with a countersunk hole 8, to cooperate with and receive the head 9 of a stove or other bolt 10. This anchor member or toggle head 6 is provided with any suitable means to hold it while it is passed through the hole 2 in the wall or other suitable support; and to position it on the rear or inaccessible surface 4 of the wall so that it will bridge the hole. This may be done by a flexible pull member manually operated, but preferably, though not necessarily, I make the pull member resilient, as for example, a rubber band 11, having loops 12, 12 which are passed through holes 13, 13 in the anchor member or toggle head 6. The ends of these loops 12, 12 can be held manually so as to hold and position the anchor member or toggle head 6 while it is passed through the hole 2. Preferably, however, I use a cooperating pull member holder 14, which is a thin plate, to which I secure the ends of the resilient pull member 12. This may be done in various ways; for example, in Fig. 1, the plate is provided with holes 15, 15 and with cuts or kerfs 16, 16 connected to the holes 15, 15 so as to form tongues 17, 17. These tongues 17, 17 may be bent up, as shown in Fig. 7, to receive the ends 12, 12 of the rubber band, and then be bent back as shown in Fig. 1.

Preferably, though not necessarily, the slot 7 and the countersunk hole 8 are arranged nearer one end than the other of the anchor member or toggle head 6.

In positioning my anchor bolt 5, the end 18 of the anchor member or toggle head 6 is preferably first pressed through the hole 2 into substantially the position shown in Fig. 2, thereby placing more or less tension upon the resilient pull member 11 and bringing the pull member holder 14 up against the face 3 of the wall or other suitable support 1, Fig. 2. When the parts are in this position, and due to the tension of the resilient pull member, the anchor member or toggle head 6 will automatically swing in the direction of the arrows to the position shown in Fig. 2, so that it will bridge or cover the end of the hole 2 (Fig. 3). In this position of the parts, and by using the pull member holder, the anchor member or toggle head 6 will be held in the position shown in Fig. 3 without further manipulation. This leaves the operator's hands free to insert the head 9 of the stove or other bolt 10. When the head 9 engages with the anchor member or toggle head 6, this member 6 will be caused to move out or rock, against the action of the resilient pull member 11 as shown in Fig. 4. By further pressure upon the stove bolt 10 the head 9 of the stove bolt will be pressed past the side of the anchor member or toggle head 6. The moment this occurs, the resilient pull member will instantly pull the member 6 back flush with the inner surface 4 of the wall or other suitable support 1, the slot 7 then receiving the shank of the stove bolt 10. By then pulling out on the stove bolt 10 the head 9 will be seated within the countersunk hole 8, and cannot be displaced or disengaged by any lateral movement of the stove bolt and anchor member or toggle head 6 with relation to each other.

The work 20 is then mounted on the stove or other bolt 10 and secured in position against the exposed surface 3 of the wall or other suitable support by means of the nut 21. In screwing up the nut 21 the ends of the pull member 11 will be flattened out, but the work 20 will not directly contact with the surface 3 of the wall on account of the interposed thin pull member holder 14 and the flattened pull member.

In some instances it is desirable to have the work 20 up flush against the surface 3, in which case I remove the pull member 11 and the pull member holder 14 as shown in Figs. 9, 10 and 11. In Fig. 9, one of the ends or loops of the resilient member has been separated so that by pulling on the pull member holder 14 with a pair of nippers, or any other tool, the pull member will be pulled out of the anchor member or toggle head 6, and it, together with the pull member holder 14, may be entirely removed, as shown in Fig. 11, where the work is secured flush against the exposed surface of the wall or suitable support 1.

Instead of employing a pull member holder, such as 14, I may use a pull member holder 22 (Fig. 8), provided with holes 23, 23 and with cuts or kerfs 24, 24 so as to permit the pull member to be slipped into the holes 23, 23 by bending a portion of the pull member holder 22.

Instead of using an anchor member or toggle head, having simply one slot and one countersunk hole, I may, in some instances, use an anchor member or toggle head 25 (Fig. 12), having two slots 26, 27 and two countersunk holes 28, 29 oppositely arranged.

In some instances I may dispense entirely with the countersunk holes 8 or 28, 29 and simply provide my anchor member or toggle head 30 (Fig. 13) with a slot 31, each side of the slot being provided with lugs 32, 32 which will prevent the head 9 of the stove or other bolt 10 being moved transversely with relation to the anchor member or toggle head after it has once been positioned. These lugs 32, 32 may be formed in any suitable manner such as by the dies which strike the anchor member or toggle head 6 from the blank of sheet metal.

Having thus described this invention in connection with illustrative embodiments thereof, to the details of which I do not desire to be limited, what is claimed as new and what is desired to secure by Letters Patent is set forth in the appended claims.

What I claim is:—

1. A new article of manufacture comprising an anchor member or toggle head adapted to cooperate with the inner surface of a wall or other support, and a resilient pull member secured to the anchor member and a pull member holder.

2. A new article of manufacture comprising an anchor member or toggle head adapted to cooperate with the inner surface of a wall or other support provided with a looped resilient pull member and a pull member holder connecting the ends of the resilient pull member.

3. The combination in an anchor bolt of an anchor member or toggle head adapted to cooperate with the inner surface of a wall or other support, engaging means on the anchor member to cooperate with a bolt, means to hold the anchor member in position, and a bolt.

4. The combination in an anchor bolt of an anchor member or toggle head adapted to cooperate with the inner surface of a wall or other support, engaging means on the anchor member to cooperate with the head of a bolt, means to hold the anchor member in position, and a bolt.

5. The combination in an anchor bolt of an anchor member or toggle head adapted to cooperate with the inner surface of a wall or other support, and provided with a slot and engaging means to cooperate with a bolt, means to hold the anchor member in position, and a bolt.

6. The combination in an anchor bolt of an anchor member or toggle head adapted to cooperate with the inner surface of a wall or other support, the anchor member being provided with a countersunk hole and a slot to cooperate with a bolt, means to hold the anchor member in position on the wall, and a bolt.

7. The combination in an anchor bolt of an anchor member or toggle head adapted to cooperate with the inner surface of a wall or other support, the anchor member being provided with a countersunk hole and a slot, the countersunk hole adapted to cooperate with the head of a bolt and the slot with the shank of the bolt, means to hold the anchor member in position on the wall, and a bolt.

WILLIAM A. HUBENER.

Witnesses:
 HENRY J. EICHENBERGER,
 DANIEL J. CURVE, Jr.